(12) United States Patent
Wu et al.

(10) Patent No.: US 7,763,817 B2
(45) Date of Patent: Jul. 27, 2010

(54) BUTTON ASSEMBLY

(75) Inventors: Zhi-Ping Wu, Shenzhen (CN); Chih-Hang Chao, Taipei Hsien (TW); Yu-Hsu Lin, San Jose, CA (US); Jeng-Da Wu, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 227 days.

(21) Appl. No.: 12/102,019

(22) Filed: Apr. 14, 2008

(65) Prior Publication Data
US 2009/0166164 A1 Jul. 2, 2009

(30) Foreign Application Priority Data
Dec. 27, 2007 (CN) .................. 2007 2 0201790

(51) Int. Cl.
*H01H 3/20* (2006.01)
(52) U.S. Cl. ..................................... 200/331; 200/341
(58) Field of Classification Search .................. 200/331
See application file for complete search history.

(56) References Cited

U.S. PATENT DOCUMENTS

| 6,570,111 | B2 * | 5/2003 | Nakagawa et al. .......... 200/343 |
| 7,102,090 | B2 * | 9/2006 | Morisada .................... 200/296 |
| 2009/0139845 | A1 * | 6/2009 | Haendler et al. ............ 200/331 |

* cited by examiner

*Primary Examiner*—Renee Luebke
*Assistant Examiner*—Lisa Klaus
(74) *Attorney, Agent, or Firm*—Frank R. Niranjan

(57) ABSTRACT

A button assembly for pressing a switch in a computer bezel includes a button connected to an arm. A cutout is defined in the computer bezel. The button is inserted in the cutout, and the arm is pivotably mounted on the computer bezel. A pressing portion extends outward from a side of the arm. A slanted pressing plane is formed on the pressing portion. Pressing the button moves the arm so that one end of the slanted pressing plane away from the arm contacts the switch. The switch resists the pressing portion, causing the arm to rotate so that the other end of the slanted pressing plane moves forward, thereby the slanted pressing plane entirely contacts and activates the switch.

10 Claims, 4 Drawing Sheets

BUTTON ASSEMBLY

BACKGROUND

1. Technical Field

The present invention relates to a button assembly, and more particularly to a button assembly secured in a computer away from a front panel of the computer.

2. General Background

A computer bezel normally has a plurality of buttons for controlling switches which are mounted on a front panel of a computer. The switches are connected to a circuit board of the computer. A button on the computer bezel is pressed to trigger a switch on the front panel thereby controlling an electrical apparatus of the computer.

But when a button is secured far away from the front panel of the computer, an arm is needed for forwarding the movement of the button to the switch on the front panel. Because of the flexibility of materials used for such arms, it's common for the arm to flex during use thus requiring greater force to operate (a user may need to press the button longer and harder), and successively drive the switch corresponding to the arm.

What is needed, therefore, is a button assembly which accurately, and with little force when the button is pressed, activates a corresponding switch.

SUMMARY

A button assembly for pressing a switch in a computer bezel includes a button connected to an arm. A cutout is defined in the computer bezel. The button is inserted in the cutout, and the arm is pivotably mounted on the computer bezel. A pressing portion extends outward from a side of the arm. A slanted pressing plane is formed on the pressing portion. Pressing the button moves the arm so that one end of the slanted pressing plane away from the arm contacts the switch. The switch resists the pressing portion, causing the arm to rotate so that the other end of the slanted pressing plane moves forward, thereby the slanted pressing plane entirely contacts and activates the switch.

Other advantages and novel features will be drawn from the following detailed description of embodiments with attached drawings, in which:

DETAILED DESCRIPTION

Figure 1:
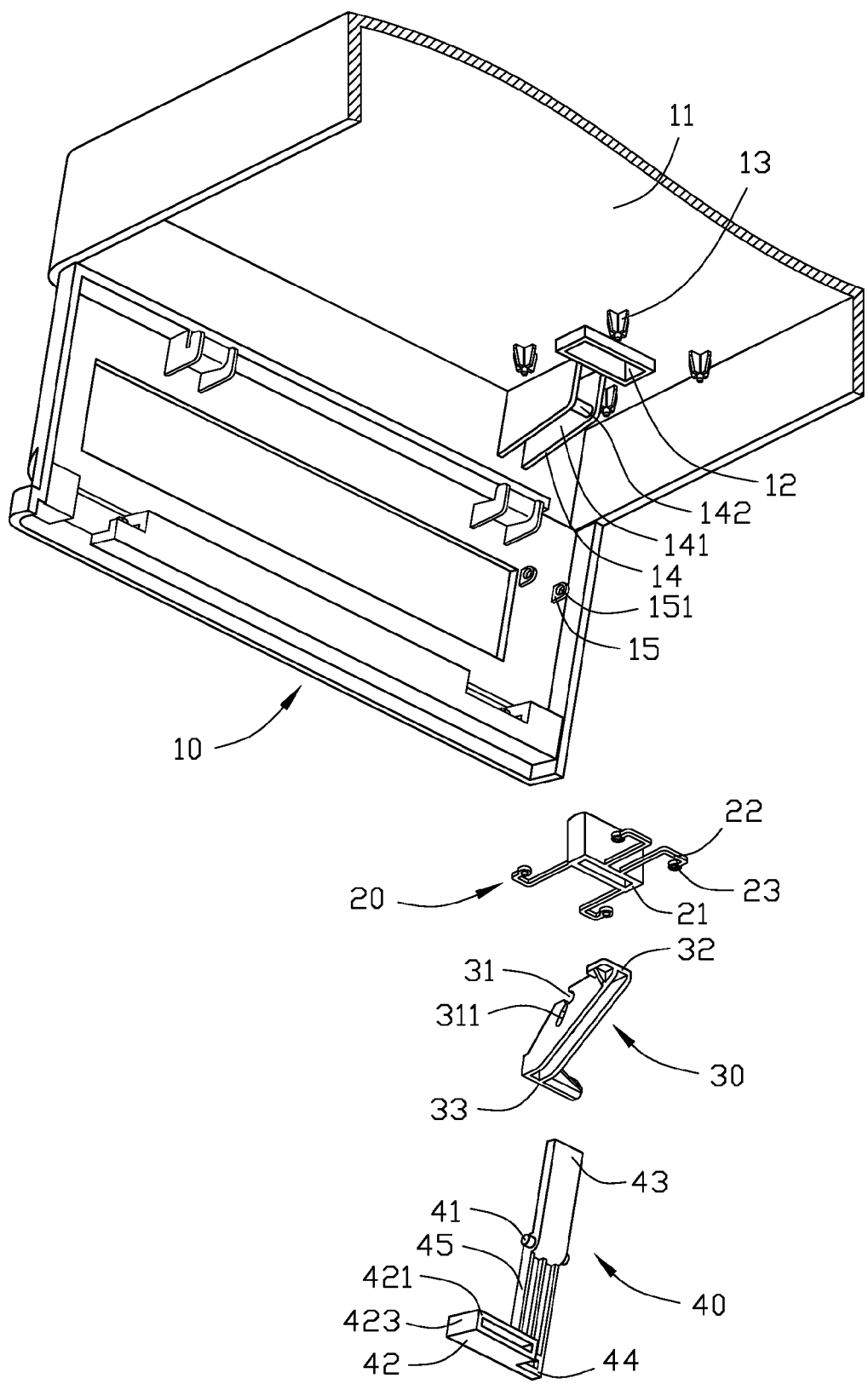
FIG. 1 is an exploded, isometric view of a button assembly pre-mounted on a top plate of a computer bezel in accordance with a preferred embodiment of the present invention.

Referring to FIG. 1, a button assembly in accordance with an embodiment of the present invention is adapted to be mounted on a top plate 11 of a computer bezel 10.

A cutout 12 is defined in the top plate 11. Four positioning posts 13 protrude from the top plate 11 around the cutout 12. Two blocking plates 14 are formed on the top plate 11 adjacent the positioning posts 13. A channel 141 is defined between the two blocking plates 14. A pivot post 142 is formed between the two blocking plates 14. A pair of resilient tabs 15 is formed on the computer bezel 10. A pivot hole 151 is defined in each tab 15.

The button assembly includes a button 20, a rotating member 30, and an arm 40. The button 20 includes a pressing end 21. Four elastic limbs 22 extend from the pressing end 21. A hole 23 is defined in the free end of each limb 22.

The rotating member 30 is adapted to be received in the channel 141. A circular cutout 31 is defined in a middle portion of the rotating member 30. A slot 311 is defined in the rotating member 30 adjacent the cutout 31. The rotating member 30 has a horizontal connecting plane 32, for engaging with the pressing end 21 of the button 20, formed on one end of the rotating member 30, and a perpendicular connecting plane 33 formed on the other end of the rotating member 30.

Figure 3:
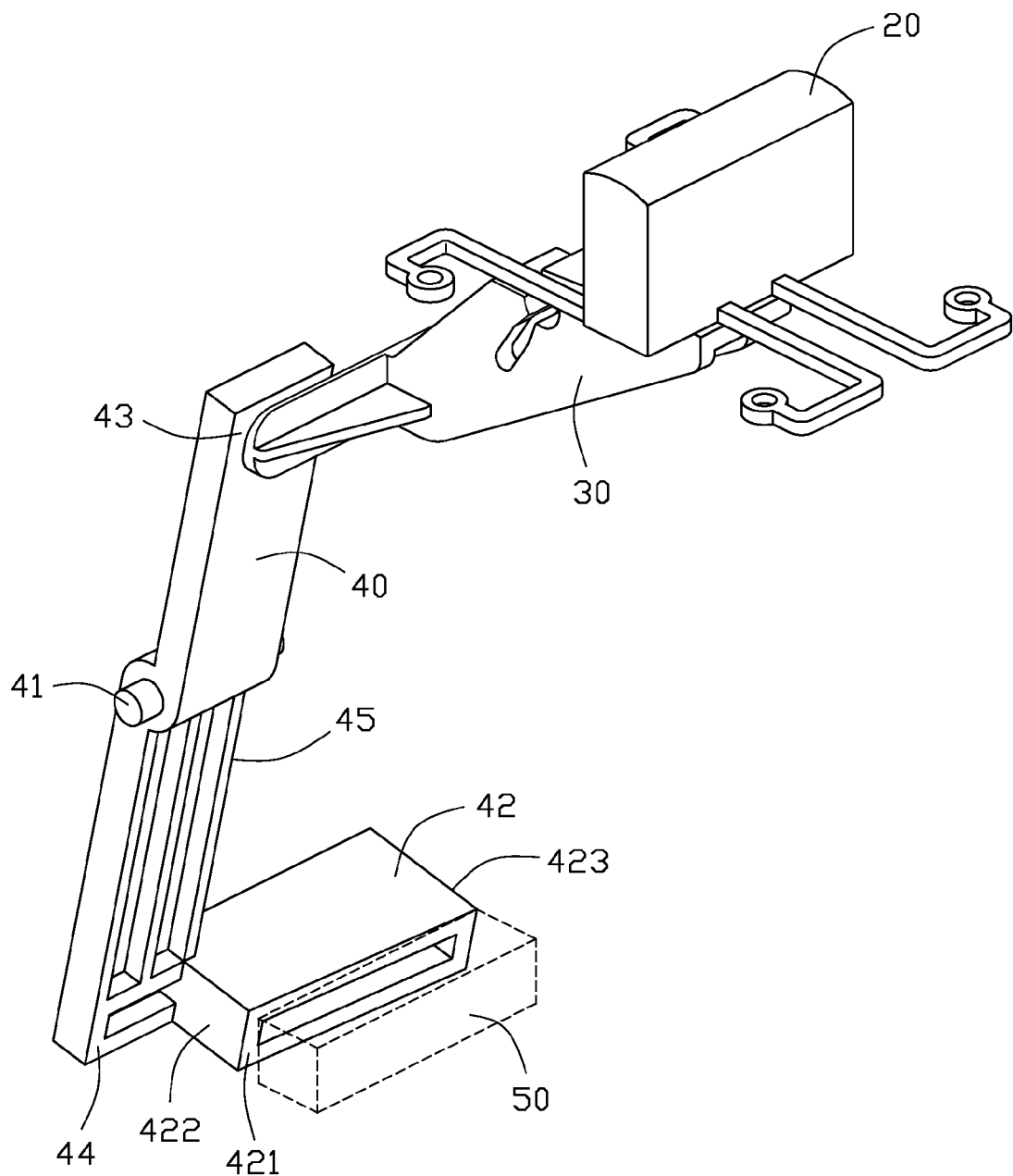
FIG. 3 is an assembled view of the button assembly of FIG. 1.

Referring also to FIG. 3, a shaft 41 is protruded from the middle portion of the arm 40. A transmittal plane 43 is formed on an end of the arm 40 for connecting to the perpendicular connecting plane 33 of the rotating member 30, and a connecting portion 44 is formed on the other end of the arm 40. A pressing portion 42 extends from a side 45 of the connecting portion 44 along the direction of the shaft 41. The pressing portion 42 includes a slanted pressing plane 421, a first plane 422 adjacent the slanted pressing plane 421 and the arm 40, and a second plane 423 adjacent the slanted pressing plane 421 and parallel to the first plane 422. The pressing portion 42 is wedge-shaped, narrow at the end on which the first plane 422 is located, and wide at the other end on which the second plane 423 is located. One end of the slanted pressing plane 421 adjacent the second plane 423 protrudes more forwardly than the other end of the slanted pressing plane 421 adjacent the first plane 422.

Figure 2:
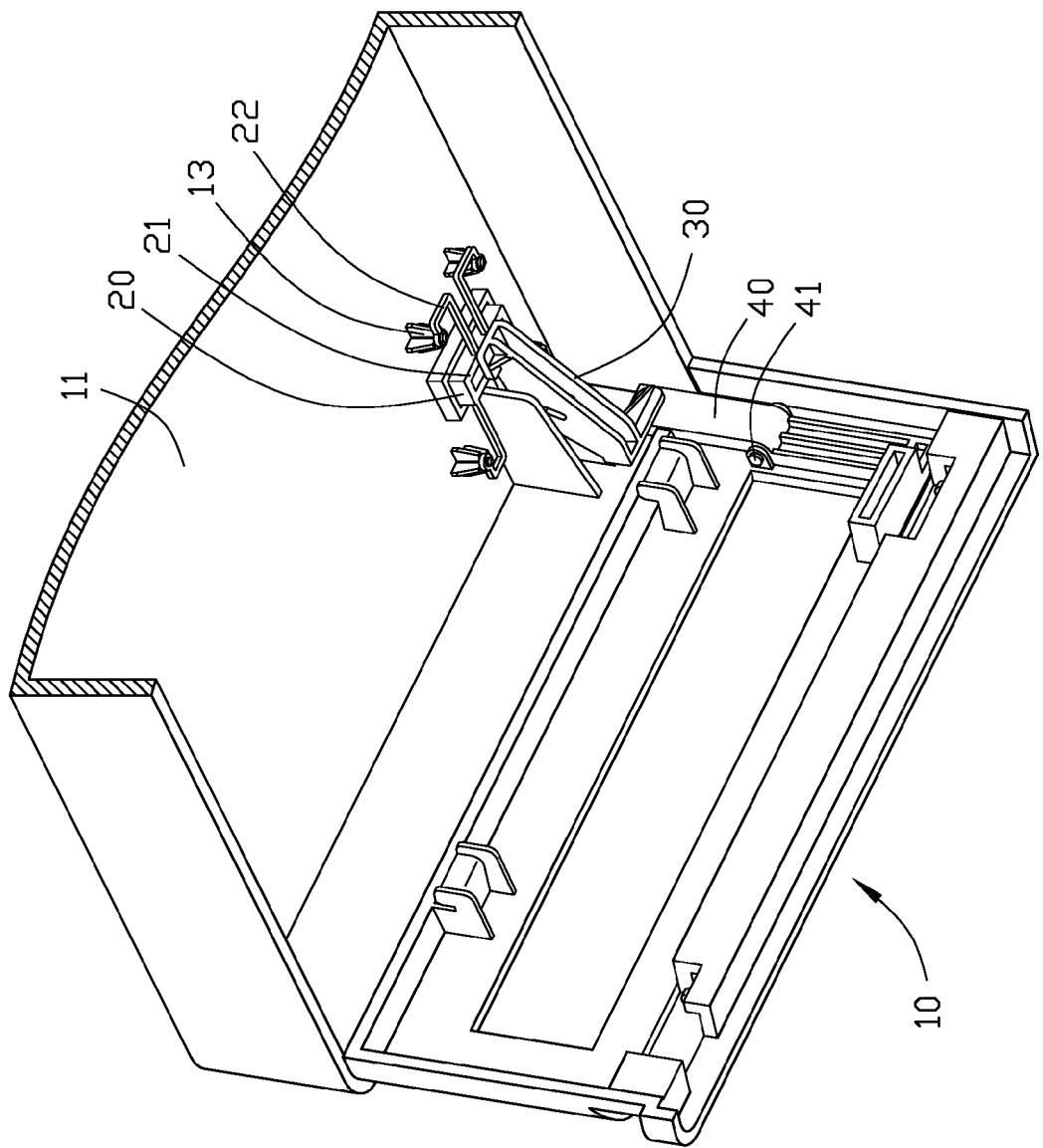
FIG. 2 is an assembled view of FIG. 1.

Referring to FIGS. 2 and 3, when mounting the button assembly on the computer bezel 10, the shaft 41 of the arm 40 is inserted into the pivot holes 151 of the tabs 15 of the computer bezel 10 to pivotably mount the arm 40 on the computer bezel 10. Then the button 20 is inserted into the cutout 12 of the top plate 11 of the computer bezel 10. Then the positioning posts 13 of the top plate 11 are inserted into the holes 23 of the elastic limbs 22 of the button 20 to mount the button 20 on the top plate 11. The pivot post 142 of the channel 141 is inserted into the cutout 31 of the rotating member 30 to pivotably mount the rotating member 30 on the computer bezel 10. Thus, the horizontal connecting plane 32 of the rotating member 30 contacts the pressing end 21 of the button 20. The perpendicular connecting plane 33 of the rotating member 30 contacts the transmittal plane 43 of the arm 40.

Figure 4:
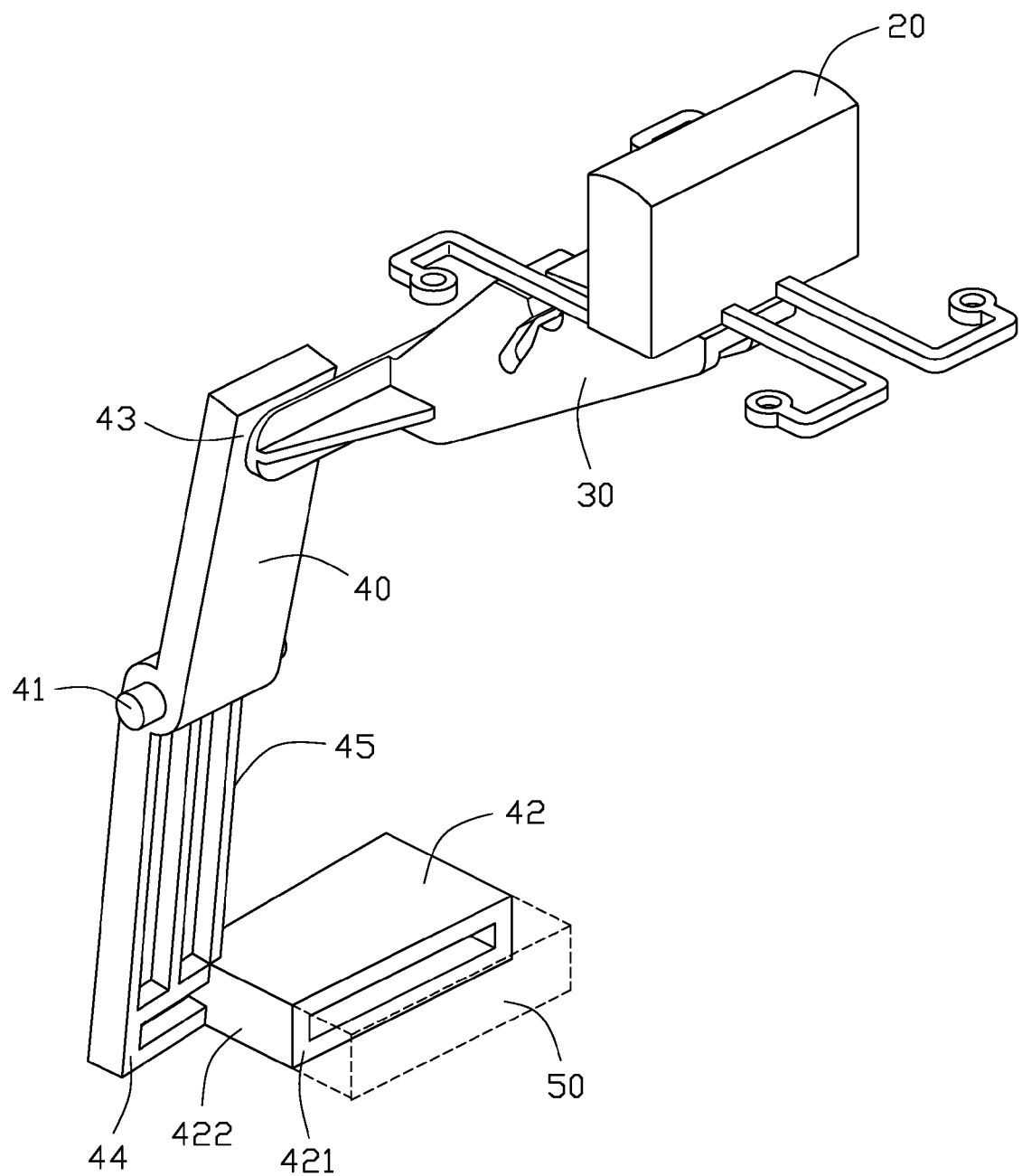
FIG. 4 is similar to FIG. 3, but after a button is pressed.

Referring also to FIGS. 3 and 4, when the button 20 is pressed down, the pressing end 21 of the button 20 pushes the horizontal connecting plane 32 of the rotating member 30. The rotating member 30 is rotated around the pivot post 142. The perpendicular connecting plane 33 of the rotating member 30 pushes the transmittal plane 43 of the arm 40. The arm 40 is rotated around the shaft 41. The pressing portion 42 pushes a switch 50, and a counterforce of the switch 50 causes the pressing portion 42 to twist the connecting portion 44. Then, one end of the slanted pressing plane 421 adjacent the first plane 422 moves forward to contact the switch. The slanted pressing plane 421 efficiently and accurately contacts the switch 50 for consistently activating the switch 50 without additional special effort.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A button assembly for pressing a switch in a computer bezel, a cutout defined in the computer bezel, the button assembly comprising:
   a button inserted in the cutout and exposed outside the computer bezel;
   a rotating member engaging with the button and pivotably mounted on the computer bezel; and
   an arm contacting the rotating member and pivotably mounted on the computer bezel, a pressing portion extending outward from a side of the arm, the pressing portion comprising a first plane adjacent the arm and a second plane, the pressing portion being wedge-shaped, narrow at an end on which the first plane is located, and wide at another end on which the second plane is located to form a slanted pressing plane between the first plane and the second plane, when the button is pressed to move the rotating member, the rotating member pushes the arm so that one end of the slanted pressing plane adjacent the second plane contacting the switch, a counterforce of the switch causing the pressing portion to twist the arm, another end of the slanted pressing plane adjacent the first plane moving forward, thereby the slanted pressing plane entirely contacting the switch for activating the switch;
   wherein a cutout is defined in the rotating member, a pivot post is formed on the computer bezel for inserting in the cutout.

2. The button assembly as described in claim 1, wherein the rotating member comprises a horizontal connecting plane for contacting the button, and a perpendicular connecting plane for contacting the arm.

3. The button assembly as described in claim 1, wherein a slot is defined in the rotating member adjacent the cutout.

4. The button assembly as described in claim 1, wherein a plurality of limbs are formed on the button, a hole is defined in each limb respectively, a positioning post is formed on the computer bezel for engagement in the respective hole.

5. The button assembly as described in claim 1, wherein a shaft protrudes from a middle portion of the arm, a pair of tabs is formed on the computer bezel, and each tab defines a hole for receiving the shaft.

6. A button assembly for pressing a switch in a computer bezel, a cutout defined in the computer bezel, comprising:
   a button inserted in the cutout and protruding through the bezel; and
   an arm engaging with the button and pivotably secured on the computer bezel, a pressing portion extending outward from a side of the arm, a slanted pressing plane formed on the pressing portion so as to firmly contact the switch in the computer bezel, when the button is pressed to move the arm, one end of the slanted pressing plane away from the arm contacts the switch, a counterforce of the switch causing the pressing portion to twist, another end of the slanted pressing plane moves forward, thereby the slanted pressing plane entirely contacting the switch for activating the switch,
   wherein the pressing portion comprises a first plane adjacent the slanted pressing plane and the arm, and a second plane adjacent the slanted pressing plane and parallel to the first plane, one end of the slanted pressing plane adjacent the second plane protrudes more forwardly than the other end of the slanted pressing plane adjacent the first plane.

7. The button assembly as described in claim 6, wherein a plurality of limbs are formed on the button, a hole is defined in each limb respectively, a positioning post is formed on the computer bezel for engagement in the respective hole.

8. The button assembly as described in claim 6, wherein a shaft is formed at the middle portion of the arm, a pair of tabs is formed on the computer bezel, and a hole is defined in each tab for receiving the shaft.

9. A computer comprising:
   a housing including a first panel and a second panel adjoining the first panel, the housing including a cutout defined in the first panel;
   a button inserted in the cutout, the button having a first end exposed outside the housing and an opposite second end received in the housing;
   a rotating member pivotably mounted on the first panel, the rotating member having a first contacting surface contacting the second end of the button, and a second contacting surface substantially perpendicular to the first contacting surface;
   a switch disposed adjacent to the second panel;
   a trigger arm pivotably mounted on the second panel, the trigger arm having a shaft pivotably coupled to the second panel, a first end contacting the second contacting surface, and an opposite second end, the trigger arm having a flat pressing surface for contacting and triggering the switch, the flat pressing surface being slanted relative to the shaft.

10. The computer as described in claim 9, wherein the first panel is substantially perpendicular to the second panel.

* * * * *